(12) United States Patent
Clark et al.

(10) Patent No.: US 10,513,470 B2
(45) Date of Patent: *Dec. 24, 2019

(54) SLOW AND FAST RELEASE FERTILIZER COMPOSITION AND METHODS FOR MAKING SAME

(71) Applicant: OSTARA NUTRIENT RECOVERY TECHNOLOGIES INC., Vancouver (CA)

(72) Inventors: Donald R. Clark, Lutz, FL (US); Dan Michael Froehlich, White Bear Lake, MN (US); Ahren Thomas Britton, Lithia, FL (US)

(73) Assignee: Ostara Nutrient Recovery Technologies Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,795

(22) Filed: Dec. 19, 2017

(65) Prior Publication Data

US 2018/0319715 A1 Nov. 8, 2018

Related U.S. Application Data

(62) Division of application No. 14/895,570, filed as application No. PCT/CA2014/050558 on Jun. 13, 2014, now Pat. No. 9,878,960.

(Continued)

(51) Int. Cl.
*C05B 7/00* (2006.01)
*C05G 3/00* (2006.01)
(Continued)

(52) U.S. Cl.
CPC .............. *C05G 3/0082* (2013.01); *C05B 1/02* (2013.01); *C05B 1/04* (2013.01); *C05B 3/00* (2013.01);
(Continued)

(58) Field of Classification Search
CPC .. C05G 3/0082; C05G 3/0047; C05G 3/0058; C05B 1/02; C05B 1/04; C05B 3/00; C05B 19/00; C05B 7/00
See application file for complete search history.

(56) References Cited

U.S. PATENT DOCUMENTS 7,622,047 B2 11/2009 Koch et al.
8,262,765 B2 9/2012 Summer et al.
(Continued)

FOREIGN PATENT DOCUMENTS

CA 2506496 A1 6/2004
CA 2770003 A1 12/2010
(Continued)

OTHER PUBLICATIONS

Guide to laboratory establishment for plant nutrient analysis, FAO Fertilizer and Plant Nutrition Bulletin 19, Food and Agriculture Organization of the United Nations, Rome, 2008 ISSN 0259-2495.

*Primary Examiner* — Jennifer A Smith
(74) *Attorney, Agent, or Firm* — Oyen Wiggs Green & Mutala LLP

(57) ABSTRACT

A homogeneous fertilizer granule comprises slow-release (e.g. struvite) and fast release sources of phosphorus (P). The homogeneous fertilizer granule may further contain other essential nutrients and micronutrients required by plants. A number of methods may be used to make such granules. One method includes introducing a struvite slurry or fines and a liquid supply of water soluble P into a granulator. Alternatively, dry raw materials can be mixed with water/steam and/or another binder prior to being fed into a granulator. In another embodiment, pre-mixed dry raw materials are mechanically compacted and crushed to yield homogeneous fertilizer particles.

26 Claims, 4 Drawing Sheets

Related U.S. Application Data

(60) Provisional application No. 61/835,476, filed on Jun. 14, 2013.

(51) Int. Cl.
    *C05B 1/02*     (2006.01)
    *C05B 1/04*     (2006.01)
    *C05B 3/00*     (2006.01)
    *C05B 19/00*     (2006.01)

(52) U.S. Cl.
    CPC ............... *C05B 7/00* (2013.01); *C05B 19/00* (2013.01); *C05G 3/0047* (2013.01); *C05G 3/0058* (2013.01)

(56) References Cited

U.S. PATENT DOCUMENTS

| | | |
|---|---|---|
| 8,444,861 B2 | 5/2013 | Lo et al. |
| 2006/0230798 A1 | 10/2006 | McConchie et al. |
| 2010/0326151 A1 | 12/2010 | Madigan et al. |
| 2011/0230353 A1 | 9/2011 | Anderson et al. |
| 2011/0314882 A1 | 12/2011 | Palmer et al. |
| 2012/0073341 A1* | 3/2012 | Goodwin .................. A01G 7/00 71/34 |
| 2013/0104612 A1 | 5/2013 | Erro et al. |

FOREIGN PATENT DOCUMENTS

| | | | |
|---|---|---|---|
| EP | 0476550 A1 | 3/1992 | |
| EP | 2266936 A1 * | 12/2010 | ............... C05D 9/00 |
| GB | 1135778 A * | 12/1968 | ............... C05B 7/00 |
| GB | 1135778 A | 12/1968 | |
| WO | 2012020427 A1 | 2/2012 | |
| WO | 2012053907 A1 | 4/2012 | |
| WO | 2013055279 A1 | 4/2013 | |

\* cited by examiner

SLOW AND FAST RELEASE FERTILIZER COMPOSITION AND METHODS FOR MAKING SAME

CROSS-REFERENCE TO RELATED APPLICATIONS

This application is a divisional of U.S. application Ser. No. 14/895,570, which is a 371 of PCT International Application No. PCT/CA2014/050558 filed 13 Jun. 2014, which claims priority from U.S. Application No. 61/835,476 filed 14 Jun. 2013. For purposes of the United States, this application claims the benefit under 35 U.S.C. § 119 of U.S. Application No. 61/835,476 filed 14 Jun. 2013 and entitled SLOW AND FAST RELEASE FERTILIZER COMPOSITION AND METHODS FOR MAKING SAME which is hereby incorporated herein by reference for all purposes.

TECHNICAL FIELD

The invention relates to fertilizers for plants. Some embodiments of the invention provide granular fertilizers that provide both slow and fast release of nutrients. Some embodiments of the invention provide methods for making fertilizer particles.

BACKGROUND

The growth and health of plants relies on a variety of nutrients. Three nutrients in particular are common components of fertilizer: nitrogen (N), phosphorus (P), and potassium (K). Fertilizers may additionally contain other active materials including macronutrients, such as magnesium (Mg), calcium (Ca), sulfur (S), micronutrients, such as boron (B), chlorine (Cl), copper (Cu), iron (Fe), manganese (Mn), molybdenum (Mo), zinc (Zn), and nickel (Ni), pesticides, herbicides, etc.

A problem with many fertilizer compositions is the lack of sustained and simultaneous availability to plants of the component nutrient sources in the fertilizer. Typically, water-soluble components rapidly permeate the soil and may be lost via leaching, run-off or chemical binding with soil minerals. Water-insoluble components may be released over longer time scales.

Availability and retention of the nutrients and other active materials within the fertilizer will also be influenced by other factors. For instance, the pH level of soil and water hardness affect the bioavailability of phosphorus because phosphorus forms insoluble precipitates when sequestered by calcium within alkaline soils and aluminum or iron within acidic soil. Irrigation with hard water is another factor that can limit the effectiveness of fertilizers to deliver phosphorus since hard water has high calcium content. A fertilizer that releases phosphorus at a lower rate (a slow-release fertilizer) can provide plants with a better opportunity to uptake this nutrient. Improved nutrient uptake increases nutrient use efficiency and decreases the amount of fertilizer required for optimum plant growth over a growing season. Furthermore, by decreasing the amount of fertilizer used and increasing the efficiency of nutrient uptake, less fertilizer may be used, and this may reduce the impact on the environment.

Various controlled or slow release fertilizers are described in the literature. These include: Agrotain™, Environmentally Smart Nitrogen (ESN™), Osmocote™ Nutricote™, and Polyon™.

Another issue of importance is the cost of fertilizers. It would be desirable to produce a fertilizer from low-cost raw materials. Struvite is a material that can be obtained as a by-product of waste water treatment processes. Harvesting struvite from wastewater is described for example in U.S. Pat. Nos. 7,622,047 and 8,444,861. Struvite has the formula $MgNH_4 PO_4.6H_2O$ and is also known as magnesium-ammonium-phosphate. Due to its low solubility in water, the slow-release nature of struvite can provide a sustained source of phosphorus over a growing season. The slow release of phosphorus also minimizes the sequestration of phosphorus by soil-borne cations as the phosphorus will only be made available by dissolution when there are plant roots present to take up the phosphorus; thus, by reducing the time phosphorus is present in the soil, the amount of sequestration by soil-borne cations is reduced. Furthermore, the presence of magnesium within struvite alleviates concerns over ineffectual phosphorus uptake by plants grown in alkaline soils or irrigated with hard water. Thus, struvite is an abundant, renewable source of water-insoluble phosphorus that may be used in the production of fertilizers.

Patent publications relating to fertilizers include:
US20060230798 discloses a fertilizing material comprising a phosphate fertilizer and a phosphate binder of a bauxite refinery residue known as red mud,
US20130104612 describes a phosphate fertilizer compound prepared from an insoluble source of phosphorus and preferably phosphate rocks in the presence of complexing compounds extracted from organic matter, and in particular the presence of humic substances to yield organo-calcium-phosphate complexes.
U.S. Pat. No. 8,262,765 discloses methods of producing a controlled release fertilizer that include intentional formation of magnesium ammonium phosphate within amino acid fermentation byproduct liquors.
US20100326151 discloses an agglomerated fertilizer product comprising of nutrients and inert solids derived from a source material such as manure or effluent.
US20110314882 discloses A fertiliser composition in the form of pellets or granules comprising an organic fertiliser in admixture with a water absorbent polymer.
WO2012020427 discloses a fertilizer comprising a water-insoluble, dilute acid-soluble polyphosphate composition.
WO2012053907 discloses a mixed release rate fertilizer composition comprising an acidulated phosphate together with a source of both slow release cobalt and quick release cobalt.

There is a need for fertilizers that can supply plants with nutrients, especially phosphorus, on both an immediate and ongoing basis.

SUMMARY

The present invention has a number of aspects. One aspect provides a fertilizer that comprises a plurality of nutrient sources in granules that are macroscopically homogeneous. The fertilizer may comprise granules made up of small particles of struvite intermixed with small particles of a fast-release phosphorus-containing material. The particles may be held together in the granules with or without a separate binder material.

Another aspect provides a granular fertilizer comprising granules having a size of at least SGN 100. The granules comprise particles of struvite having sizes of about SGN 10 or less and particles of a water-soluble phosphorus-containing material having sizes of about SGN 10 or less. The struvite particles contain in the range of 6% to 18% (in some embodiments 7% to 17% or 8% to 16%) of total phosphate in the granules.

In some embodiments the water-soluble phosphorus-containing material is acidic in aqueous solution. For example, a saturated solution of the water-soluble phosphorus-containing material may have a pH of 5.5 or less. In some embodiments the water-soluble phosphorus-containing material comprises a material selected from the group consisting of single superphosphate, triple superphosphate, monoammonium phosphate and combinations thereof. In some embodiments the fertilizer granules consist essentially of struvite and the water-soluble-phosphorous-containing material. In some embodiments the particles of struvite are uniformly distributed in the granules within ±7%.

In some embodiments the particles of struvite and the particles of water-soluble phosphorus-containing material are exposed on outer surfaces of the granules. The particles of struvite and the particles of water-soluble phosphorus-containing material may be uniformly distributed on outer surfaces of the granules.

In some embodiments the granules have a struvite content in the range of 12 to 28% by weight. In some embodiments substantially all phosphate in the granules is in the form of struvite or the water-soluble phosphorus-containing material. In some embodiments the water-soluble phosphorus-containing material is monoammonium phosphate.

A fertilizer according to this aspect may optionally comprise a binder which may, for example, comprise monoammonium phosphate, calcium lignosulphonates, starch or molasses.

An example embodiment provides a fertilizer comprising granules that consist essentially of struvite and monoammonium phosphate.

Another aspect of the invention provides the use of a fertilizer as described herein for growing any of a wide range of plants. For example, the use of a fertilizer for growing tuber plants such as potatoes or leafy plants such as lettuce.

Another aspect provides a granular fertilizer having granules that comprise a mixture of struvite and a relatively fast-release phosphorus-containing material homogeneously distributed within the granules. The non-struvite fraction of the granules may comprise water-soluble sources of phosphorus derived, for example, from phosphoric acid; single super phosphate (SSP); double super phosphate (DSP); triple super phosphate (TSP—$Ca(H_2PO_4)_2 \cdot H_2O$); monoammonium phosphate (MAP); diammonium phosphate (DAP); or dicalcium phosphate. Fertilizers according to these aspects of the invention may optionally include other nutrients such as additional sources of nitrogen, potassium, sulfur, or any other nutrient or micronutrient useful for plant growth or health and/or other active materials such as pesticides, selective herbicides, and the like.

Fertilizer granules according to different embodiments comprise varied proportions of slow- and fast-release phosphorus. Embodiments having different proportions of slow- and fast-release phosphorus may be used in different applications based on phosphorus demand from targeted plants. Some preferred embodiments comprise struvite in the range of 12% by weight to 28% by weight.

Other aspects of the invention provide methods for making granular fertilizers. The methods involve granulating a mixture of struvite fines and water soluble material containing phosphorus. The methods of different aspects differ in regard to the manner of introduction of the water-soluble material containing phosphorus. In one example embodiment, the water-soluble material containing phosphorus has a liquid phase and, in the liquid phase is combined with struvite fines to form a slurry which is processed to yield granules in a granulator. Other plant nutrient sources can be added to yield a homogeneous fertilizer particle of various compositions.

Another example embodiment utilizes water and/or steam and/or a binder to produce a slurry comprising desired proportions of struvite and a water-soluble material containing phosphorus, and the slurry is processed in a granulator to yield granules.

Another example embodiment pre-mixes small particles or powders of dry struvite and water-soluble material containing phosphorus. The mixture is compacted to yield a dense form such as a sheet. The dense form is then crushed to produce homogeneous granules of fertilizer.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the system to the precise forms of any example embodiment. Accordingly, the description and drawings are to be regarded in an illustrative, rather than a restrictive, sense.

Figure 1:
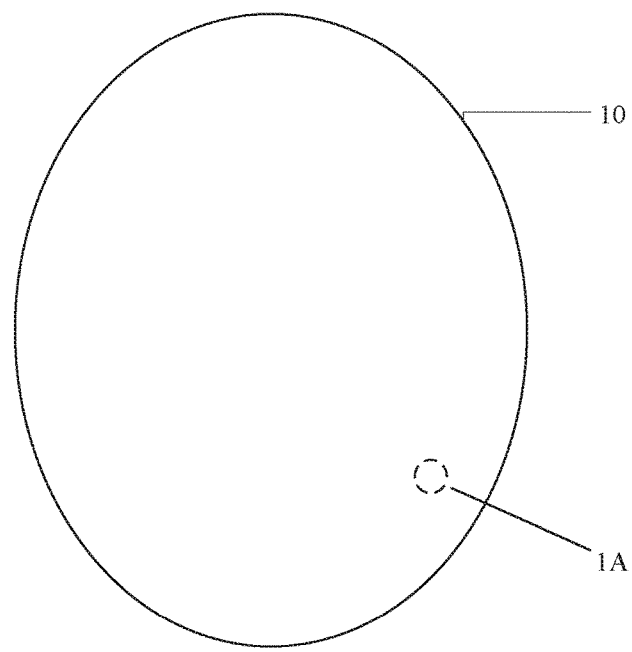
FIG. 1 shows a cross-section of a fertilizer granule according to an example embodiment.
Figure 1A:
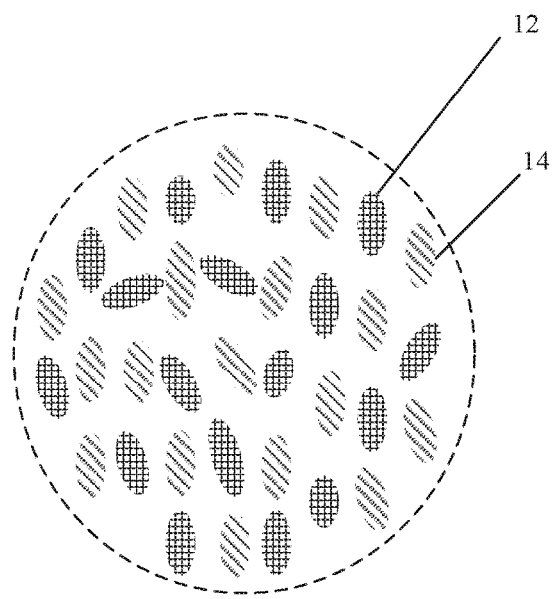
FIG. 1A is a further magnified view of a portion 1A of the fertilizer granule of FIG. 1.
Figure 1B:
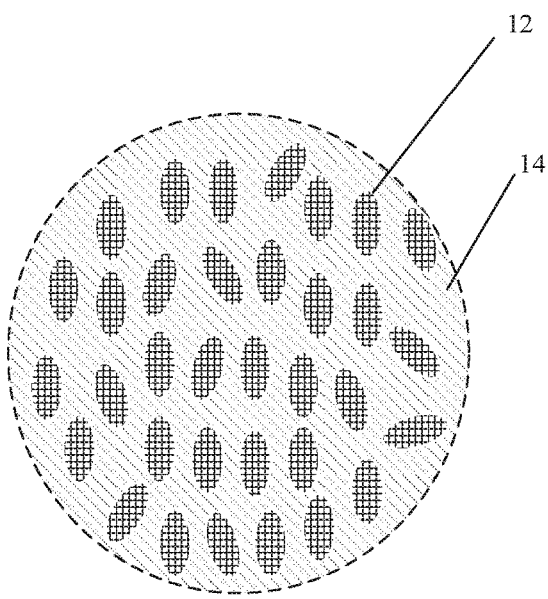
FIG. 1B is a magnified view of a portion of a fertilizer granule according to another embodiment.

FIG. 1 is a magnified cross-section of an example fertilizer granule 10. FIG. 1A is a further magnified view of a portion 1A of granule 10. FIG. 1B is a magnified view of a portion of granule 10 according to another embodiment. As can be best seen in FIG. 1A, granule 10 comprises small particles of struvite 12 evenly intermixed with small particles of a water-soluble phosphorus-containing material 14. Water-soluble phosphorus-containing material 14 is preferably a material that, when dissolved in water, liberates phosphorus in a form that can be taken up efficiently by plants (for example, in the form of ions of $H_2PO_4^-$ and $HPO_4^{-2}$). In some embodiments, water-soluble phosphorus-containing material 14 is monoammonium phosphate (MAP), diammonium phosphate (DAP), a combination of both, or other suitable phosphates as would be known to a person skilled in the art in light of the present disclosure.

The applicant has found that phosphorus is released more quickly from struvite particles 12 when struvite particles 12 are in an acidic environment. This may be achieved, for example, by selecting a water-soluble phosphorus-containing material 14 that is acidic. For example, water-soluble phosphorus-containing material 14 may comprise one or more of single superphosphate, triple superphosphate or monoammonium phosphate, all of which are acidic. A solution of single superphosphate typically has a pH≤2. A solution of triple superphosphate typically has a pH in the range of about 1 to 3. A solution of monoammonium phosphate typically has a pH in the range of 4 to 4.5. In some embodiments, dissolution in water of those parts of a granule 10 that dissolve readily in water yields an acidic solution. In some embodiments, the pH of such a solution, when saturated, does not exceed 5.5 and does not exceed 5 in some embodiments. Varying the composition of granules 10 to adjust the acidity of those parts of a granule 10 that dissolve readily in water is one way to adjust a period over which phosphorus from struvite particles 12 is made available for uptake by plants.

Making those parts of a granule 10 that dissolve readily in water less acidic can make release of phosphorus from struvite particles slower while making those parts a granule 10 that dissolve readily in water more acidic can make release of phosphorus from struvite particles 12 occur more rapidly once granules 10 become dampened by contact with soil.

Combining struvite with a water soluble source of phosphorus allows immediate and sustained delivery of phosphorus to plants. The presence of struvite 12 throughout granule 10 prevents the water-soluble phosphorus-containing material 14 that is not on the surface of granule 10 from being able to contact any surrounding water. Particles of water-soluble phosphorus-containing material 14 inside granule 10 are protected until outer layers of granule 10 are eroded to the point that particles of water-soluble phosphorus-containing material 14 inside granule 10 are exposed to water.

Phosphorus, usually as phosphate ($P_2O_5$), may be present in fertilizers in various different forms. The availability of phosphate in any particular fertilizer for take up by plants depends on the form in which the phosphate is present. This availability may be assessed by determining the solubility of the fertilizer in various solvents. For example, phosphate may be present in forms which are: water soluble; neutral ammonium citrate soluble or insoluble; citric acid soluble or insoluble; and acid soluble. "Available phosphorus" may be defined as the sum of the water soluble and citrate soluble fractions of a phosphate fertilizer. Plants are capable of utilizing both forms of the soluble sources.

Example methods for determining water soluble phosphate and citrate soluble phosphate are described in:
AOAC: Official Methods of Analysis 15$^{th}$ Edition, 1990, which describes standard methods specified by the standards body AOAC International (ASSOCIATION of OFFICIAL ANALYTICAL CHEMISTS);
Guide to laboratory establishment for plant nutrient analysis; FAO Fertilizer and plant nutrition bulletin 19; FOOD AND AGRICULTURE ORGANIZATION OF THE UNITED NATIONS, Rome, 2008 ISSN 0259-2495 both of which are hereby incorporated herein by reference.

Water-soluble phosphate ($P_2O_5$) of a fertilizer sample may be determined, for example, by dissolving the sample in distilled water or by washing the sample successively with distilled water. For example, a 1 g fertilizer sample may be placed on a filter paper fitted on a funnel. The sample may be washed with small portions of water until 250 ml of filtrate has been collected. The phosphate content of the filtrate may then be measured, for example using a gravimetric method such as the gravimetric quinolinium phosphomolybdate method or the volumetric ammonium phosphomolybdate method. The residue remaining on the filter paper contains the water-insoluble portion of P in the sample which can also be analyzed to determine the phosphate content.

Citrate soluble phosphate may be measured in a similar manner using as a solvent a neutral ammonium citrate solution.

In some embodiments, water-soluble phosphorus-containing material 14 has at least 80% water soluble phosphate content In some embodiments, struvite particles 12 comprise 5% or less water soluble phosphate and at least 80% citrate soluble phosphate. Struvite typically has a water solubility of not more than about 1.0% and a citrate solubility on the order of 99%. MAP typically has a water solubility on the order of about 87% and a citrate solubility on the order of about 13%.

The relative amounts of struvite 12 and water-soluble phosphorus-containing material 14 can vary widely. In some embodiments, the struvite content of granules 10 is in the range of about 1% to about 99% struvite by weight. In other embodiments, the struvite content of granules 10 is in the range of about 5% to 50% by weight and the content of water-soluble phosphorus-containing material 14 is in the range of about 95% to 50% by weight. Applicant has discovered that a particularly advantageous relative amount of struvite for certain applications is in the range of 7% to 15% of total phosphate provided by struvite particles 12 and the remaining 93% to 85% of the total phosphate content being provided by the water-soluble phosphorus-containing material 14. In the case where the water-soluble-phosphorus-containing material 14 is MAP, this corresponds to about 12% to 28% by weight of the phosphate-containing components of the granules being struvite with the remaining 88% to 72% by weight being MAP.

Granule 10 may be homogeneous at a macroscopic level. In one embodiment, the small particles of struvite 12 and water-soluble phosphorus-containing material 14 are evenly dispersed throughout granule 10. In other embodiments, granule 10 is packed tightly with particles of struvite 12 and water-soluble phosphorus-containing material 14. In other embodiment, granule 10 is packed loosely with particles of struvite 12 and water-soluble phosphorus-containing material 14. In yet other embodiments, the outer region of granule 10 has a higher concentration of water-soluble phosphorus-containing material 14 relative to the interior region. In further embodiments, particles of struvite 12 and water-soluble phosphorus-containing material 14 are exposed on the outer surface of granule 10. In other embodiments, particles of struvite 12 and water-soluble phosphorus-containing material 14 are uniformly distributed on the outer surface of granule 10 ±7%. In yet other embodiments, the outer region of granule 10 has a higher concentration of struvite 12 relative to the interior region. In some embodiments, the ratio of struvite 12 to water-soluble phosphorus-containing material 14 is constant to within ±7% throughout granule 10. In one embodiment, particles of struvite 12 are uniformly distributed in granule 10 within ±7%. In another embodiment, particles of water-soluble phosphorus-containing material are uniformly distributed in granule 10 within ±7%.

In example embodiments, granule 10 is characterized by a diameter or other characteristic dimension on the order of about 1 to 6 mm. Particle sizes may be described by a size guide number (SGN). SGN is given by the diameter of the median granule size in millimeters multiplied by 100. For example, a SGN of 311 corresponds to a median particle size of 3.11 mm. In one embodiment, granules 10 have a size at or between about SGN 100 to SGN 600.

The particles of struvite 12 and water-soluble phosphorus-containing material 14 have characteristic dimensions that are 100 times or more smaller than the characteristic dimension of granule 10 (e.g. not exceeding about 0.1 mm (SGN 10 or passing 150 mesh size screen) in some embodiments and not exceeding about 75 µm (SGN 7.5/passing 200 mesh size screen) in other embodiments). In some embodiments, the particles of struvite 12 are about 100 µm or less (about SGN 10 or less). In other embodiments, the particles of water-soluble phosphorus-containing material 14 are about 100 µm or less (about SGN 10 or less). The size of the particles of struvite 12 in granules 10 can be adjusted to modify the dissolution rate of the struvite phase of granules 10. For instance, if slower dissolution of struvite 12 is needed, then the size of the particles of struvite 12 may be made larger. On the other hand, if faster dissolution of struvite 12 is needed, then the size of the particles of struvite 12 may be made smaller.

In one embodiment, particles of struvite 12 and particles of water-soluble phosphorus-containing material 14 are similar in size. In other embodiments, such particles are identical in size. In yet other embodiments, particles of struvite 12 and particles of water-soluble phosphorus-containing material 14 have different sizes.

Granule 10 may have a hardness/crush strength of about 4 lbs or greater.

In one embodiment, granules 10 are spherical or substantially spherical in shape. In other embodiments, granules 10 are elliptical or substantially elliptical in shape. Granules 10 may have other shapes. Advantageously, granules 10 have shapes that allow bulk granules 10 to properly flow through equipment used to apply the granules such as fertilizer spreaders and/or fertilizer drills.

In one embodiment, granules 10 are substantially uniform in size. In another embodiment, there is heterogeneity to the size of granules 10. In yet other embodiments, fertilizers comprise mixtures of different sizes of granules 10. In other embodiments, fertilizers comprise mixtures of granules 10 having different compositions of struvite 12 and water-soluble phosphorus-containing material 14. In yet other embodiments, fertilizers comprise mixtures of granules 10 having different distributions of struvite 12 and water-soluble phosphorus-containing material 14. Preferably, granules 10 are of sufficiently similar size so that granules 10 do not segregate during transport of granules 10.

In one embodiment, struvite 12 and water-soluble phosphorus-containing material 14 are in the form of distinguishable particles within granules 10. In other embodiments, as illustrated in FIG. 1B, particles of water-soluble phosphorus-containing material 14 are in the form of a matrix surrounding particles of struvite 12. In other embodiments, granules 10 are formed of layers of particles of struvite 12 and particles of water-soluble phosphorus-containing material 14. In yet other embodiments, granules 10 are formed of alternating layers of particles of struvite 12 and particles of water-soluble phosphorus-containing material 14. In further embodiments, such alternating layers of particles of struvite 12 and particles of water-soluble phosphorus-containing material 14 are concentric alternating layers.

Granules 10 may optionally comprise a binder for use in binding together particles of struvite 12 and particles of water-soluble phosphorus-containing material 14. In one embodiment, the binder is calcium lignosulphonates. In other embodiments, the binder is starch. In yet other embodiments, the binder is molasses. In a further embodiment, the binder is MAP.

Granules 10 may further optionally be coated with a coating. In one embodiment, the coating is a biological agent. In yet other embodiments, the coating comprises plant-growth promoting rhizobacteria, such as *rhizobium, azotobacter, azospirillum,* and/or cyanobacteria. In further embodiments, the coating comprises other materials that may enhance plant growth. In other embodiments, the coating comprises one or more materials that may assist in the controlled release of phosphorus, such as a thermoplastic.

In one embodiment, upon placement of granules 10 in an area having moisture, such as soil-laden areas, particles of water-soluble phosphorus-containing material 14 are the first to dissolve upon contact with moisture. Upon such dissolution, granules 10 would then contain cavities through which moisture can penetrate. Moisture penetrating granules 10 through these cavities will encourage dissolution of particles of water-soluble phosphorus-containing material 14 within the unexposed portions of granules 10.

An initial greenhouse study grew lettuce for 9 weeks. Fertilizer as described herein comprising granules of struvite co-granulated with MAP in different proportions was applied at a $P_2O_5$ application rate of 80 lbs $P_2O_5$/acre equivalent. Soil was a sandy loam. Greenhouse lighting provided 16 hours of sunlight/day. This study showed that fertilizer comprising 15% struvite by weight was 3.7% higher yielding and fertilizer containing 25% struvite by weight was 3.0% higher yielding than a comparison plot fertilized with mono-ammonium phosphate. Tested fertilizer compositions which included more than 25% struvite or less than 15% struvite by weight provided poorer yields of lettuce. A follow-up greenhouse experiment found that the fertilizer containing 15% by weight struvite was 1.7% higher yielding than a comparison plot fertilized with mono-ammonium phosphate.

In a greenhouse study one plot was fertilized with a fertilizer comprising a blend of struvite granules and MAP granules. A comparison plot was fertilized with a fertilizer comprising a blend of struvite particles with di-ammonium phosphate (DAP) granules. It was found that the struvite—MAP blend generated a 15.9% higher yield than the struvite-DAP blend. The total amount of phosphate and the amount of phosphate provided in the form of struvite were the same in both cases.

In a field trial growing lettuce, fertilizer as described herein comprising pellets of struvite co-granulated with MAP in different proportions was applied at a $P_2O_5$ application rate of 80 lbs $P_2O_5$/acre equivalent. Soil was a sandy loam. For comparison a plot was fertilized with a co-blended fertilizer comprising 25% by weight struvite in which struvite and MAP were provided by separate granules. The field trial found that the fertilizer containing 15% struvite by weight and the fertilizer containing 25% struvite by weight performed equally and were 29.9% higher yielding than the co-blended fertilizer.

These trials found that a co-granulated product (i.e. a homogeneous product with water soluble and slow release P in each granule) was more effective at lower slower release P content than a comparable co-blended fertilizer in which water soluble phosphate and slow-release phosphate were provided in individual separate granules.

One application of a fertilizer as described herein is in growing potatoes or other similar plants. Such a fertilizer may be applied in an amount sufficient to provide a desired level of water-soluble phosphate to induce formation of many potatoes during the early tuber initiation phase. The same fertilizer can then provide sufficient slow-release phosphate to support the filling out of those many small potatoes during the potato bulking phase later in the season. This may improve both potato yield and grade. By contrast, applying a fertilizer comprising phosphate that is entirely in a water-soluble form according to typical current farming practices can result in a large number of potatoes being initiated and then growing slowly due to a non-optimally low concentration of available phosphate in the soil later in the season. The potatoes then remain too small (or of lesser value small-size grades).

Granules like granule 10 may be made in various ways. The following are some non-limiting example processes for making fertilizer granules. Any of these processes may be applied to make fertilizer granules like granule 10 described above. In preferred embodiments, the fertilizer granules include small particles of struvite. The processes differ in terms of the manner in which the struvite particles are processed to yield fertilizer granules.

Figure 2:
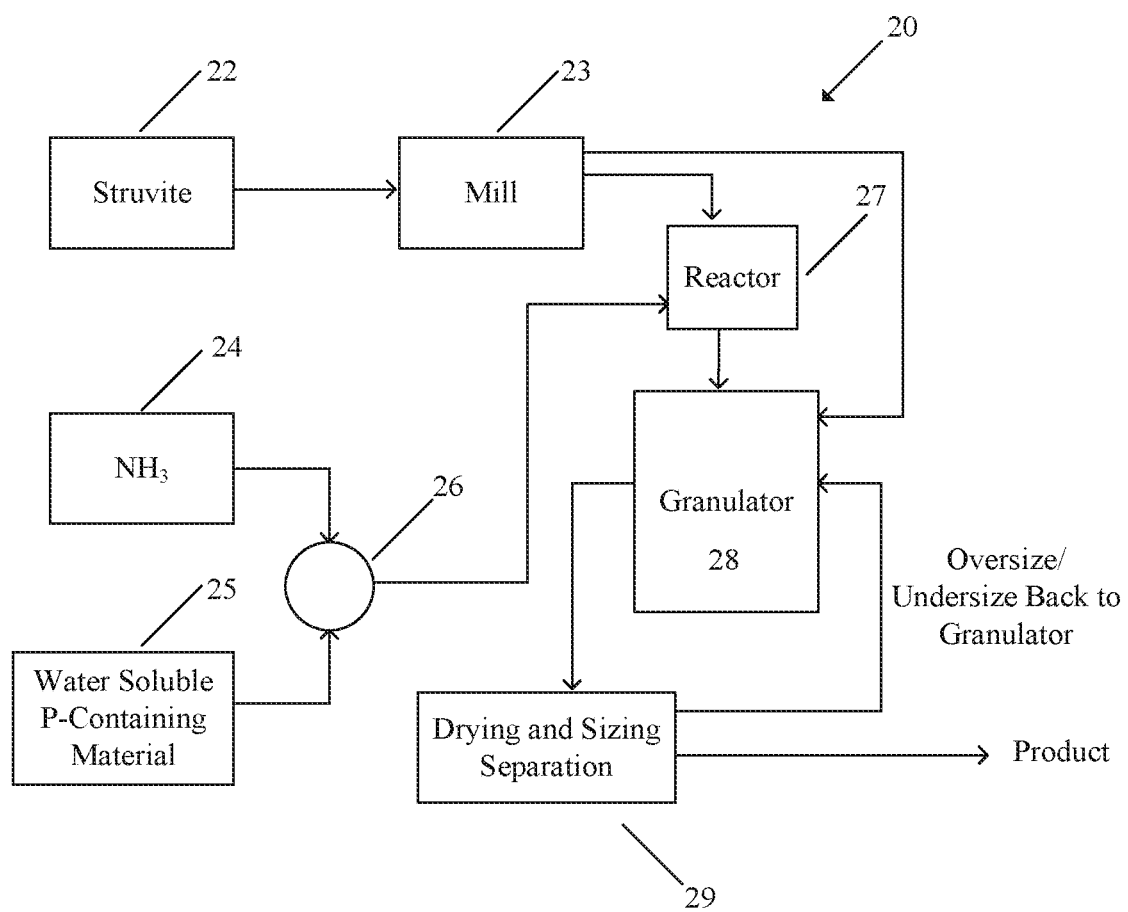
FIG. 2 is a process diagram illustrating a first example method for making fertilizer granules.

FIG. 2 illustrates a process 20 according to one example embodiment. Process 20 involves chemical granulation. In process 20, granules may be formed by accretion. In process 20, struvite 22 is powdered, for example by crushing or grinding in a suitable mill 23 (unless the struvite 22 is already in the form of suitably small particles). Liquid phase material 26 is obtained by reacting ammonia 24 with a water-soluble phosphate 25 such as phosphoric acid or other soluble phosphates known to a person skilled in the art. This reaction may be performed in a suitable reactor such as a suitable tank-type pre-neutralizer or a pipe-type reactor.

Powdered struvite 22 and liquid-phase material 26 are introduced into a granulator 28. This may be done by mixing the powdered struvite 22 and liquid phase material 26 to form a slurry in the reactor 27 and then introducing the slurry into granulator 28. Fines of struvite 22 may also be introduced into granulator 28 directly from mill 23 or by a recycle path, where struvite 22 may be mixed with dried recycle material (e.g. a material comprising recycle dry product and/or crushed oversize material and/or undersized material), for example. In some embodiments a pug mill or other mechanical mixing device may be used to premix dry solids (e.g. struvite) and liquid prior to introduction to granulator 28. Where struvite 22 is introduced directly into granulator 28 as fines, in some embodiments, the struvite particles 22 may have sizes of about 1 mm diameter or less. In other embodiments, the struvite particles 22 may have a size of less than 100 µm in diameter.

Optionally a binder is added to granulator 28 to enhance granule strength and cohesiveness. Calcium lignosulphonate, starch or molasses binders may be used to help improve granulation. MAP may also be used as a binder.

In some embodiments the material entering granulator 28 has a struvite content in the range of up to 25% by weight (e.g. 1% to 25%). In some embodiments the material entering granulator 28 has a struvite content in the range of about 12% to about 28% by weight. In some embodiments the proportion of the total phosphate in the material entering granulator 28 provided by the phosphate in the struvite is in the range of 6% to 18% (7% to 15% in some embodiments). Preferably, the struvite content of materials entering granulator 28 is of such a proportion that granule 10 will remain cohesive and have sufficient struvite to make the product economically attractive. Struvite particles 22 may be injected as fines into the recycle stream of the granulation plant or as a slurry into granulator 28. The particular makeup of the solid and liquid raw materials delivered to granulator 28 will depend on the specific formulation of the fertilizer being produced according to non-exhaustive variables including 1) desired nutrient ratios, 2) nutrient solubility requirements, 3) heat of reaction, 4) temperature limitations to limit thermal breakdown of struvite, 5) pH, and 6) process plant and equipment limitations.

Granulator 28 may, for example, comprise a rotary drum, fluidized bed, pug mill, pipe reactor, or Spherodizer®. Steam, water, scrubber liquor, and/or additional ammonia and acid may optionally be fed into granulator 28 in order to optimize granulation characteristics of each particular formulation.

In addition to phosphorus, granule product produced by process 20 may also contain water-soluble forms of nitrogen, a macronutrient in fertilizers. In one embodiment, nitrogen in products originate from MAP and DAP, both of which contain water soluble nitrogen in ammonia form.

Granule products produced by process 20 may also contain magnesium, another macronutrient. In one embodiment, magnesium in the product originates from thermal breakdown of struvite 22 that is fed into granulator 28. In some embodiments, the temperature range of the product bed leading to breakdown of struvite 22 is 55° C. to 75° C.

Granules output by granulator 28 are dried and screened at 29 to yield product size material. The product may be cooled and coated to reduce caking. Granules of sizes outside of a desired range (oversize and/or undersize) may be crushed and returned to granulator 28. Such oversized or undersized granules may help to absorb the excess moisture in granulator 28 and to control product size.

In one embodiment, granule products are screened at 29 for size using screeners. In other embodiments, granule products are separated by weight.

Figure 3:
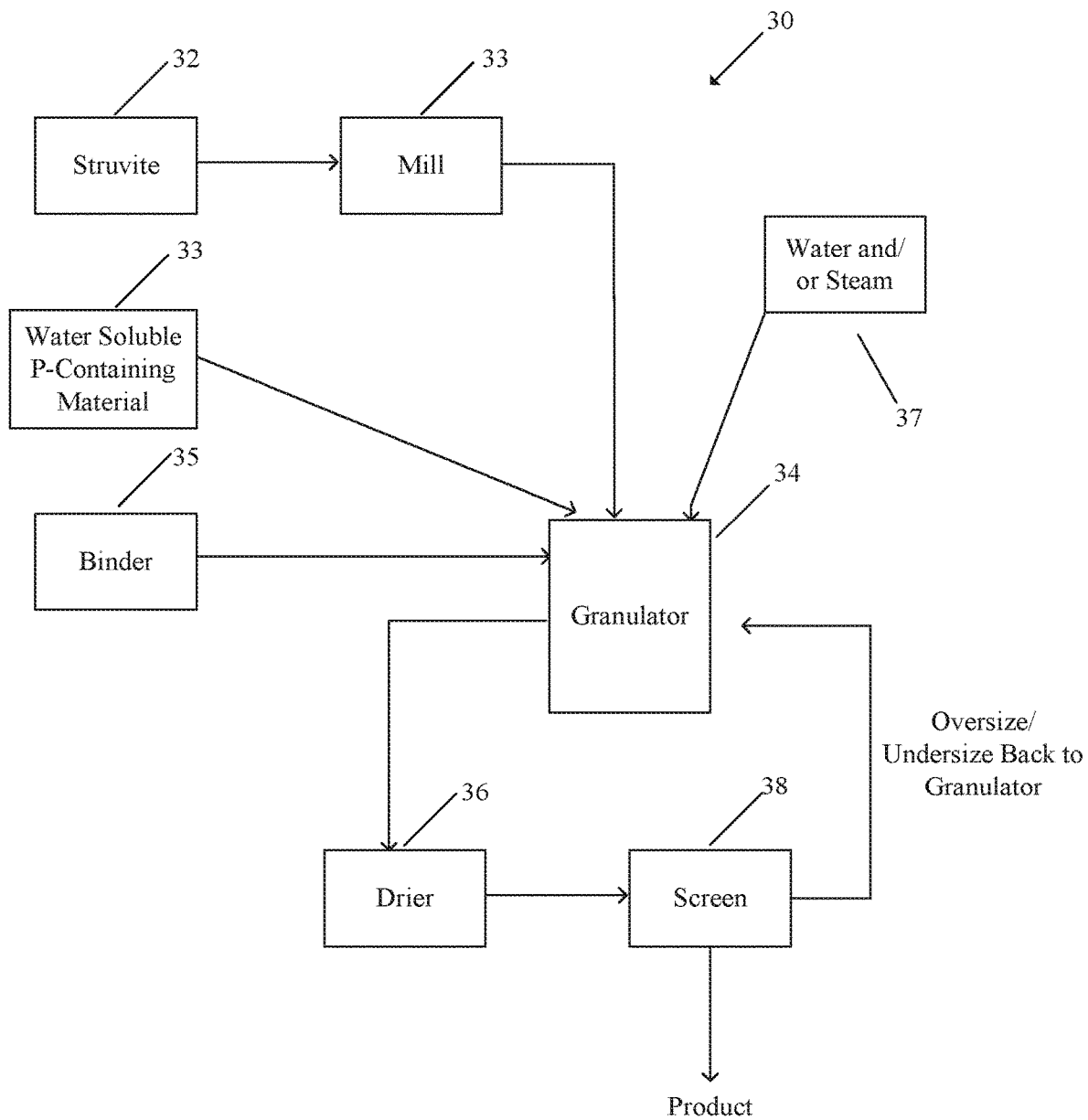
FIG. 3 is a process diagram illustrating a second example method for making fertilizer granules.

FIG. 3 illustrates a process 30 according to another example embodiment which produces fertilizer granules by steam/water granulation. In process 30, the addition of steam and/or water 37 to a granulator 34 provides all or most of the liquid needed for granulation.

In process 30, struvite 32 is powdered, for example by crushing or grinding in a suitable mill 33 (unless the struvite 32 is already in the form of suitably small particles). It can be convenient to provide struvite 32 as a slurry with a moisture content of up to 25% by weight. In one embodiment, particles of struvite 32 have a diameter of up to 1 mm. In other embodiments, particles of struvite 32 have a diameter of up to 100 µm. Struvite 32 and other powdered raw materials 33 (e.g. one or more of a water-soluble phosphorus-containing material, other nutrients, a binder 35 (e.g. MAP, calcium lignosulphonates, starch or molasses etc.)) are proportioned and fed into granulator 34. The materials may enter granulator 34 together or in two or more separate streams. Optionally, raw materials which may optionally include one or more liquids, are premixed, for example in a pug mill or similar device (not shown) prior to being fed into granulator 34. Struvite 32 may also be added into granulator 34 by a recycle path (the recycle path may carry, for example, recycle dry product and/or crushed oversize material and/or undersized material).

Granulator 34 may comprise, for example a, rotary drum, pug mill, or pan granulator. Steam and/or water 37 is introduced into granulator 34 in an amount sufficient to cause the dry raw materials to agglomerate into granules having the desired size and properties.

Granules are dried at a drier 36 and screened at a screen 38 or other size selector to separate product size granules from granules that are oversize or undersize. Oversized and undersized granules may be crushed and recycled to granulator 34. In one embodiment, granules are screened at screen 38 by weight. Product size material may also be recycled and re-introduced into granulator 34 as part of the recycle process to absorb the excess moisture in the granulator and to control product size. If required, the product may be cooled and coated to reduce caking.

Figure 4:
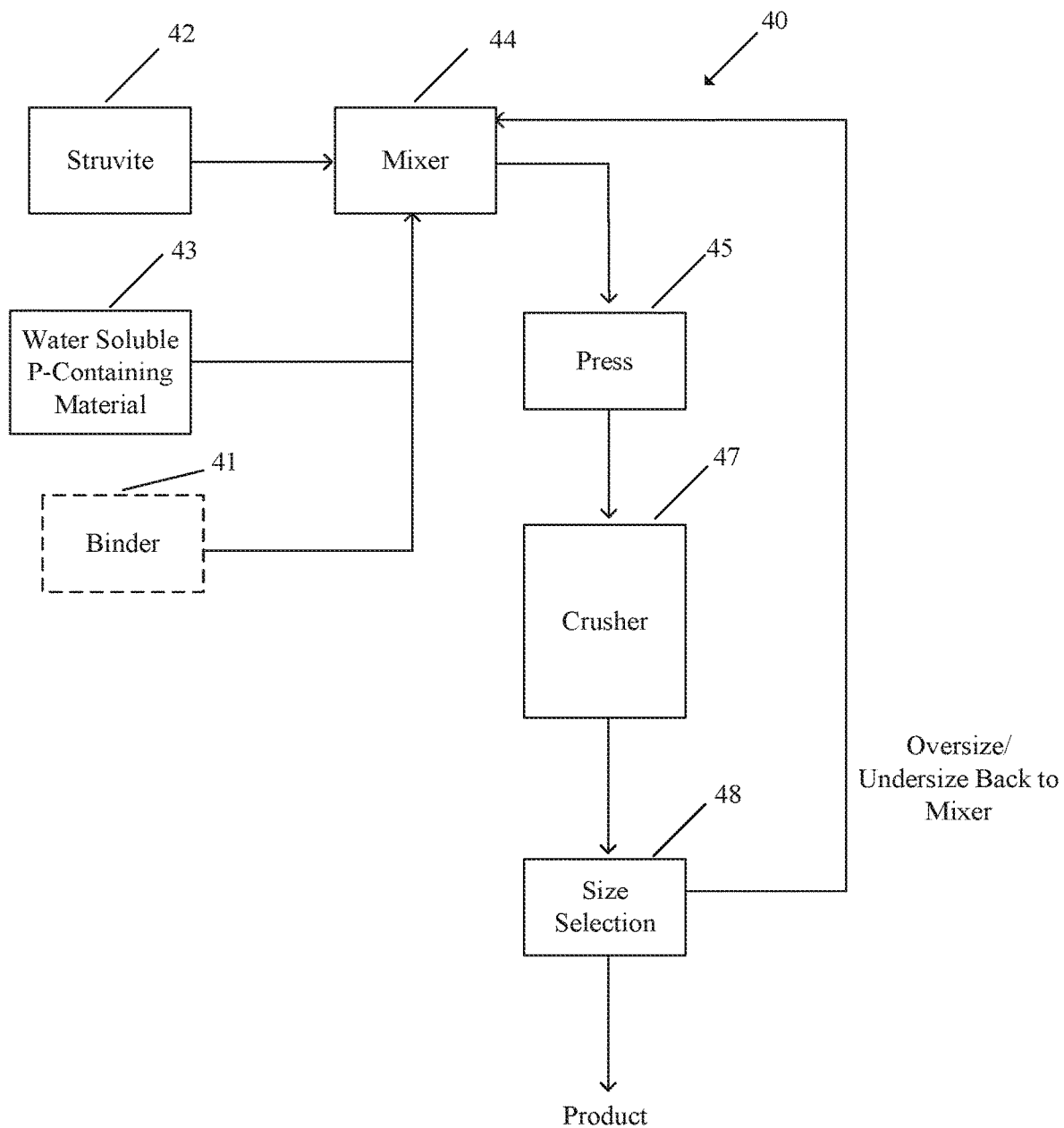
FIG. 4 is a process diagram illustrating a third example method for making fertilizer granules.

FIG. 4 is a process diagram depicting a process 40 according to another example embodiment in which fertilizer granules are formed from dry raw materials by compaction.

In process 40, fine, non-granular sources of struvite 42, water-soluble phosphorus-containing material 43, and any other nutrient to be incorporated into the homogeneous fertilizer product particles are proportioned and thoroughly mixed at a mixer 44. Advantageously, the size of particles of struvite 42 is about 100 µm or below (about SGN 10 or less). Advantageously, the size of particles of water-soluble phosphorus-containing material is about 100 µm or below (about SGN 10 or less). Optionally, suitable material (as described herein for example) may be added to the mixture as binder 41 to enhance product characteristics. Other fertilizer ingredients that are desired to achieve the desired nutrient ratios, mixture of water soluble and slow release components, product characteristics and/or micronutrients may optionally be added to the mixture.

The mixture is pressed into a compact form by a suitable press 45. For example, in one embodiment, the mixture may be formed into a dense hard sheet, which in some embodiments is approximately 2-3 cm thick, by the addition of mechanical force. Press 45 may comprise, for example, a number of horizontally-opposed rollers that counter-rotate. The mixture is then compressed in passing between the rollers.

The resulting sheet of fertilizer may then be is crushed in a controlled manner, for example by a crusher 47 to yield smaller granules. The crushed material may then be screened at a screen or other size selector 48 to obtain granules of a desired product size range. In some embodiments, size selector 48 selects granules by weight. Oversize and undersized particles may be crushed and returned to press 45.

Granules of granular fertilizers prepared by compaction will typically have shapes that are more irregular as compared to granules produced by the other granulation processes discussed above.

The granules produced by any of the methods described herein may have struvite (1% to 99% by weight) and soluble phosphorus (99% to 1% by weight) as required for a desired application. In some embodiments the granules comprise struvite in the range of 12% to 28% by weight. In some embodiments the proportion of the total phosphate in the granules provided by the phosphate in the struvite is in the range of 6% to 18% (7% to 15% in some embodiments). Substantially all of the remainder of the phosphate is in the form of soluble phosphorus in some embodiments.

Product granules similar to granules 10, which may be produced by any of the production processes disclosed above, may be used to fertilize plants in different ways. For example, the product granules may be applied as a banded fertilizer by placement of the product granules below the surface of the soil. In some embodiments, the product granules are placed at least 2 cm below the surface. In other embodiments, the product granules may also be applied by incorporation into the soil.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

In addition, while elements are at times shown as being performed sequentially, they may instead be performed simultaneously or in different sequences. It is therefore intended that the following claims are interpreted to include all such variations as are within their intended scope.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. The A granular fertilizer comprising:
granules having sizes of at least SGN 100, the granules comprising struvite in the form of particles of struvite having sizes of about SGN 10 or less and a water-soluble source of phosphorus in the form of particles of the water-soluble source of phosphorus having sizes of about SGN 10 or less;
wherein:
the struvite particles contain at least 6% of total phosphate in the granules;
the particles of the water-soluble source of phosphorus contain more of the total phosphate in the granules than the struvite particles;
a weight ratio of the water-soluble source of phosphorus to struvite in the granules is in the range of 1.3:1 to 6:1; and
the granules have a struvite content in the range of 15% to 40% by weight.

2. The fertilizer according to claim 1 wherein the water-soluble source of phosphorus is acidic in aqueous solution.

3. The fertilizer according to claim 2 wherein a saturated solution of the water-soluble source of phosphorus has a pH of 5.5 or less.

4. The fertilizer according to claim 1 wherein dissolution in water of those parts of the granules that dissolve readily in water yields an acidic solution that, when saturated, has a pH of 5.5 or less.

5. The fertilizer according to claim 1 wherein the water-soluble source of phosphorus material comprises a material selected from the group consisting of single superphosphate, triple superphosphate, monoammonium phosphate and combinations thereof.

6. The fertilizer according to claim 5 wherein the water-soluble source of phosphorus is diammonium phosphate.

7. The fertilizer according to claim 5 wherein the water-soluble source of phosphorus is monoammonium phosphate.

8. The fertilizer according to claim 1 wherein the water-soluble source of phosphorus comprises one or more of: phosphoric acid; single super phosphate; double super phosphate; triple super phosphate; monoammonium phosphate; diammonium phosphate; and dicalcium phosphate.

9. The fertilizer according to claim 1 further comprising a sulfur-containing nutrient material.

10. The fertilizer according to claim 1 wherein substantially all phosphate in the granules is in the form of struvite or the water-soluble source of phosphorus.

11. The fertilizer according to claim 1 wherein struvite and the water-soluble source of phosphorus are exposed on outer surfaces of the granules.

12. A fertilizer according to claim 11 wherein particles of struvite and particles of the water-soluble source of phosphorus are uniformly distributed on the outer surfaces of the granules.

13. The fertilizer according to claim 1 wherein an outer region of the granules has a higher concentration of the water-soluble source of phosphorus relative to an interior region of the granules.

14. The fertilizer according to claim 1 wherein the granules are substantially spherical in shape or substantially elliptical in shape.

15. The fertilizer according to claim 1 wherein the presence of struvite throughout the granules prevents the water-soluble source of phosphorus that is not on the surface of the granules from contacting surrounding water and protects the particles of water-soluble source of phosphorus that are in the interior of the granule until outer layers of the granule are eroded to the point that the particles of water-soluble source of phosphorus are exposed to water.

16. The fertilizer according to claim 1 wherein the particles are held together in the granules without a separate binder material.

17. A granular fertilizer comprising:
granules having sizes of at least SGN 100, the granules comprising struvite in the form of particles of struvite having sizes of about SGN 10 or less and a water-soluble source of phosphorus in the form of particles of the water-soluble source of phosphorus having sizes of about SGN 10 or less;
wherein:
the struvite particles contain at least 6% of total phosphate in the granules;
the particles of the water-soluble source of phosphorus contain more of the total phosphate in the granules than the struvite particles;
a weight ratio of the water-soluble source of phosphorus to struvite in the granules is in the range of 1.3:1 to 6:1; and
the particles of struvite are uniformly distributed in the granules.

18. The fertilizer according to claim 17 wherein the granules comprise no more than 40% by weight of struvite.

19. The fertilizer according to claim 17 wherein the water-soluble source of phosphorus comprises a material selected from the group consisting of single superphosphate, triple superphosphate, monoammonium phosphate and combinations thereof.

20. The fertilizer according to claim 17 wherein the presence of struvite throughout the granules prevents the water-soluble source of phosphorus that is not on the surface of the granules from contacting surrounding water and protects the particles of water-soluble source of phosphorus that are in the interior of the granule until outer layers of the granule are eroded to the point that the particles of water-soluble source of phosphorus are exposed to water.

21. The fertilizer according to claim 17 wherein an outer region of the granules has a higher concentration of the water-soluble source of phosphorus relative to an interior region of the granules.

22. A granular fertilizer comprising a slow release low water-solubility source of phosphorus and a fast release water-soluble source of phosphorus bound together into granules;
wherein:
the slow release source of phosphorus comprises struvite;
the struvite is in a particulate form;
the fast release source of phosphorus is a water-soluble phosphorus-containing material in particulate form;
particles of struvite are uniformly distributed in the granules; and
wherein the fast release source of phosphorus makes up more than 50% by weight of the granules.

23. The fertilizer according to claim 22 wherein a weight ratio of the water-soluble phosphorus containing material to struvite in the granules is in the range of 1:1 to 6:1.

24. The fertilizer according to claim 22 wherein the water-soluble phosphorus-containing material comprises one or more of: phosphoric acid; single super phosphate; double super phosphate; triple super phosphate; monoammonium phosphate; diammonium phosphate; and dicalcium phosphate.

25. The fertilizer according to claim 22 further comprising a sulfur-containing nutrient material.

26. The fertilizer according to claim 22 wherein the particles are held together in the granules without a separate binder material.

* * * * *